United States Patent
Das et al.

(10) Patent No.: US 8,688,727 B1
(45) Date of Patent: Apr. 1, 2014

(54) GENERATING QUERY REFINEMENTS

(75) Inventors: Anwis Das, Sunnyvale, CA (US);
Abhinandan S. Das, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 235 days.

(21) Appl. No.: 13/094,794

(22) Filed: Apr. 26, 2011

Related U.S. Application Data

(60) Provisional application No. 61/328,161, filed on Apr. 26, 2010.

(51) Int. Cl.
*G06F 17/30* (2006.01)

(52) U.S. Cl.
USPC .......................................... 707/766; 707/748

(58) Field of Classification Search
USPC ................................ 707/748, 766
See application file for complete search history.

(56) References Cited

U.S. PATENT DOCUMENTS

2012/0209858 A1* 8/2012 Lamba et al. ................. 707/748

OTHER PUBLICATIONS

Hearst, M.A., "Automatic Acquisition of Hyponyms from Large Text Corpora", Proceedings of the Fourteenth International Conference on Computational Linguistics, Nantes, France, Jul. 1992, pp. 1-8.

* cited by examiner

*Primary Examiner* — Huawen Peng
(74) *Attorney, Agent, or Firm* — Fish & Richardson P.C.

(57) ABSTRACT

Methods, systems, and apparatus, including computer program products, for generating query refinements. In one implementation, a method includes dividing a search query into one or more n-grams; determining that each of the one or more n-grams represents a same concept, and in response to the determination: selecting one or more candidate refinement queries; determining one or more categories for the search query; determining one or more categories for each of the candidate refinement queries; determining a respective first score for each of the candidate refinement queries; and identifying as query refinements for the search query one or more of the candidate refinement queries based on the first scores.

48 Claims, 4 Drawing Sheets

GENERATING QUERY REFINEMENTS

CROSS REFERENCE TO RELATED APPLICATION

This application claims the benefit under 35 U.S.C. §119(e) of U.S. Patent Application No. 61/328,161, filed Apr. 26, 2010, entitled "Generating Query Refinements," which is incorporated by reference herein in its entirety.

BACKGROUND

This specification relates to generating query refinements.

Internet search engines provide information about Internet accessible resources, e.g., Web pages, images, text documents, multimedia content, that are responsive to a user's search query by returning a set of search results in response to the search query. A search result includes, for example, a Uniform Resource Locator (URL) and perhaps a snippet of descriptive information for resources responsive to a search query. A search engine may also present query refinements, e.g., other queries related to the user's search query, that may be directed to what a user may consider to be relevant to the search.

SUMMARY

In general, one aspect of the subject matter described in this specification can be embodied in methods that include the actions of obtaining a search query; dividing the search query into one or more n-grams; determining that each of the one or more n-grams represents a same concept, and in response to the determination: selecting one or more candidate refinement queries; determining one or more categories for the search query; determining one or more categories for each of the candidate refinement queries; determining a respective first score for each of the candidate refinement queries, wherein determining the respective first score for a particular candidate refinement query comprises adjusting the respective first score for the particular candidate refinement query based on a number of categories shared between the particular candidate refinement query and the search query; and identifying as query refinements for the search query one or more of the candidate refinement queries based on the first scores. Other embodiments of this aspect include corresponding systems, apparatus, and computer program products.

These and other embodiments can optionally include one or more of the following features. Selecting one or more candidate refinement queries comprises: selecting one or more training terms as candidate refinement queries, wherein the training terms occur in a same context as the search query in training data. A respective right context of each of the selected training terms includes at least one word in a right context of the search query that is not a stop word, and wherein a respective left context of each of the selected training terms includes at least one word in a left context of the search query that is not a stop word. The respective right contexts and left contexts of the selected training terms are features of at least one of the previously submitted queries having a frequency of being submitted beyond a threshold value. Generating a feature vector for the search query and for one or more of the selected training terms, wherein the respective first score for a particular selected training term is based at least in part on a dot product of a mathematical function of a feature vector of the search query and a mathematical function of a feature vector of the particular selected training term.

Selecting one or more candidate refinement queries comprises: Selecting one or more previously submitted queries as candidate refinement queries, wherein the selected previously submitted queries were submitted during a first search session following submission of the search query. The selected previously submitted queries do not contain any terms from the search query that are not stop words. The respective first score for each of the selected previously submitted queries is based at least in part on a respective correlation value for each selected previously submitted query, wherein the correlation value for a particular previously submitted query represents the correlation between the search query and the particular previously submitted query.

Selecting one or more candidate refinement queries comprises: selecting as candidate refinement queries one or more sibling queries of the search query, wherein sibling queries are queries that have one or more shared parent queries in common, and wherein each of the sibling queries was submitted during a second search session following submission of a shared parent query during the first search session. The search query is textually distinct from each of the selected sibling queries and all the substrings of the selected sibling queries. Determining the one or more categories for a particular candidate refinement query includes: determining, in training data, a frequency of occurrence of the particular candidate refinement query in a Hearst pattern with a particular category label; and determining that the particular candidate refinement query belongs to a category corresponding to the particular category label based on the frequency of occurrence.

Determining that the search query is parent-like; and selecting only candidate refinement queries that are parent-like as being refinement queries for the search query. Determining that a particular query is parent-like includes: generating a modified query that semantically represents a grouping, where the grouping is related to a lexical item represented by the particular query; and determining that the particular query is parent like when the modified query has a frequency of being submitted beyond a threshold value.

Particular embodiments of the subject matter described in this specification can be implemented to realize one or more of the following advantages. Generating and providing query refinements for display to a user reduces how much user interaction is required to obtain alternatives to an input search query, and perform searches using one or more of the alternatives. The alternatives can be textually different, e.g., include alternatives that are not expansions or completions of the input search query, and in a same domain, e.g., be related to a same category or topic as the input search query. In addition to saving time, providing query refinements can increase the precision, accuracy, and coverage, including diversity, of a search by capturing alternatives to the input search query that are directed to what a user may consider to be relevant to the search. In particular, query refinements can allow the user to broaden a search in a direction related to the input search query, but different from the input search query. For example, query refinements can provide suggested topics of interest, e.g., by suggesting terms that identify concepts related to the input search query.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
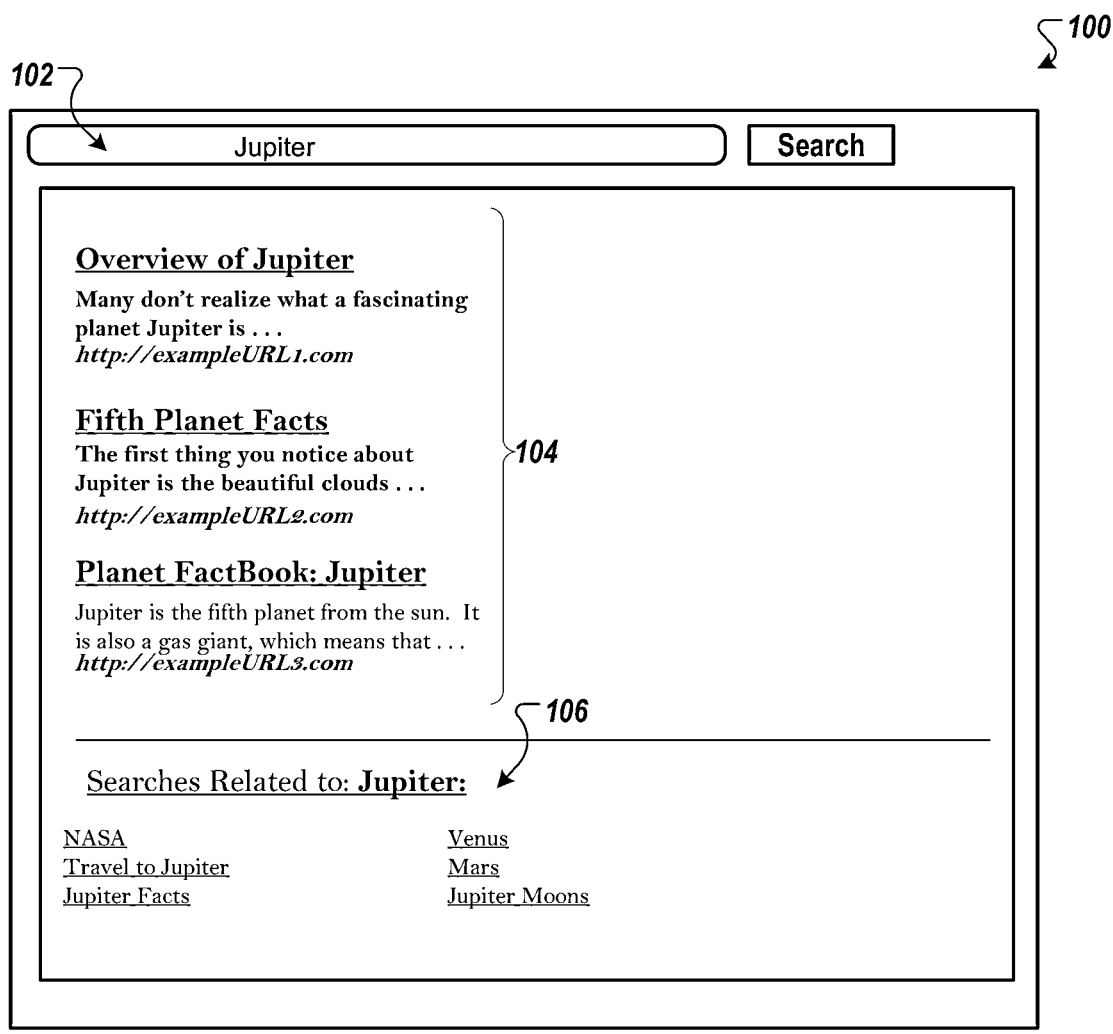
FIG. 1 is a screenshot illustrating an example graphical user interface presenting search results and query refinements.

FIG. 1 is a screenshot illustrating an example graphical user interface (GUI) 100 presenting search results 104 and query refinements 106. In some implementations, the GUI 100 can be implemented in a web browser or other software application. A query "Jupiter" 102 is submitted to a search engine through the GUI 100, and the search results 104 that are responsive to the query 102 are generated by the search engine and presented in the GUI 100. A search result can include a web page title, a snippet of text extracted from the web page, and the URL of the web page. As an example, one search result illustrated in FIG. 1 includes a web page title "Overview of Jupiter", a snippet "Many don't realize what a fascinating planet Jupiter is . . . ", and a URL "http://exampleURL1.com".

While FIG. 1 shows a visual display of search results 104, presenting search results can include various forms of presentation including, for example, transmitting search results to a user's computer for presentation to the user, transmitting search results to another device, transmitting sounds corresponding to the search results, providing haptic feedback corresponding to the search results, or transmitting signals including haptic feedback corresponding to the search results to a user's computer for presentation to the user. Other methods of presenting search results are possible.

In some situations, the query 102 is a starting point for the exploration of a topic, or is an attempt to find specific information. When users are exploring a topic, they are often looking for a general overview of the topic that may not be provided by search results alone. When the user is looking for specific information, the search results will often be what the user is looking for, and a user will click (e.g., select with a mouse or other input device, for example, a keyboard, or a tactile or audio input device) one or more of the search results 104.

In some situations, a user may not be satisfied with the search results 104 generated in response to a query. Users can be unsatisfied, for example, when the queries they submit are too broad. For example, when a user submits "Jupiter" but is really looking for "Jupiter moons," the search engine may identify search results that are relevant to Jupiter, but not relevant to the moons of Jupiter. Users can also be unsatisfied, for example, when the queries they submit use incorrect terminology. For example, a user may submit a query for "Jupiter," but really be interested in information on "Mars." Other reasons for user dissatisfaction are also possible.

To help users that were not presented with the search results they desired or to help users interested in exploring a topic of interest, a group of query refinements 106, e.g., related queries that a user may find have search results that are more relevant to the user's interests, can be generated and presented in the GUI 100. The search engine can generate the query refinements 106, for example.

A query refinement of a given query is another query that is related to the given query. Some of the query refinements 106 presented in the user interface 100 are sibling queries to the user-entered query "Jupiter" 102. In general, two queries are siblings when one or more users submitted one of the queries after submitting a given parent query, and one or more users submitted the other query after submitting the given parent query.

When a user selects one of the query refinements 106 (e.g., "NASA"), the search engine presents, in the GUI 100, a new set of search results responsive to a query including the query refinement. In some implementations, the search engine can also present a new group of query refinements for the selected query refinement along with the new set of search results.

Figure 2:
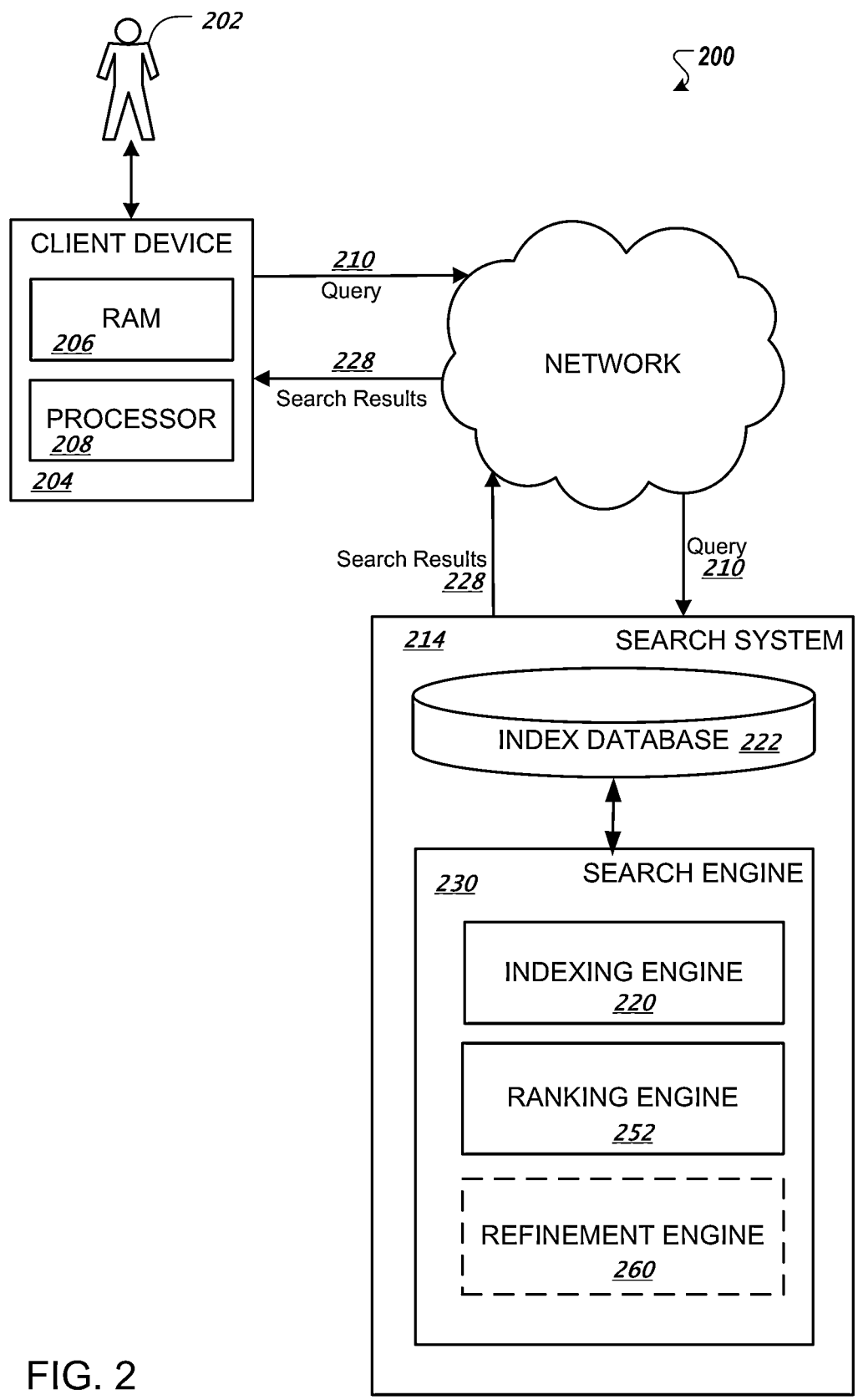
FIG. 2 is a block diagram illustrating an example of data flow in an example system that generates query refinements.

FIG. 2 is a block diagram illustrating an example of data flow in an example system 200 that generates query refinements. A user 202 interacts with a search system 214 through a client device 204. The search system 214 is an example of an information retrieval system that can be used to generate search results 228 and query refinements. The client device 204 can be a computer (e.g., a personal computer, a mobile phone, a smart phone, a tablet computer, and so on) coupled to the search system 214 through a wired or wireless local area network (LAN) or wide area network (WAN), e.g., the Internet. In some implementations, the search system 214 and the client device 204 are the same device. For example, a user can install a desktop search application on the client device 204. The client device 204 will generally include a random access memory (RAM) 206 and a processor 208.

A user 202 submits a query 210, e.g., a search query, to a search engine 230 within a search system 214. When the user 202 submits a query 210, the query 210 is transmitted through a network to the search system 214. The search system 214 can be implemented as, for example, computer programs running on one or more computers in one or more locations that are coupled to each other through a network. The search system 214 includes an index database 222 and a search engine 230. The search system 214 responds to the query 210 by generating search results 228, which are transmitted through the network to the client device 204 in a form that can be presented to the user 202 (e.g., as a search results web page to be displayed in a web browser running on the client device 204).

When the query 210 is received by the search engine 230, the search engine 230 identifies documents that match the query 210. The search engine 230 will generally include software that implements an indexing engine 220 that is configured to index documents, e.g., web pages, images, multimedia content, or news articles on the Internet, found in a corpus, e.g., a collection or repository of content, an index database 222 that stores the index information, and a ranking engine 252 (or other software) to rank the documents that match the query 210. The indexing and ranking of the documents can be performed, for example, using conventional techniques. The search engine 230 transmits the search results 228 through the network to the client device 204 for presentation to the user 202.

The search system further 214 includes a refinement engine 260 which generates query refinements. The search 230 engine can provide the query refinements to the client device 204 along with the search results 228.

Figure 3:
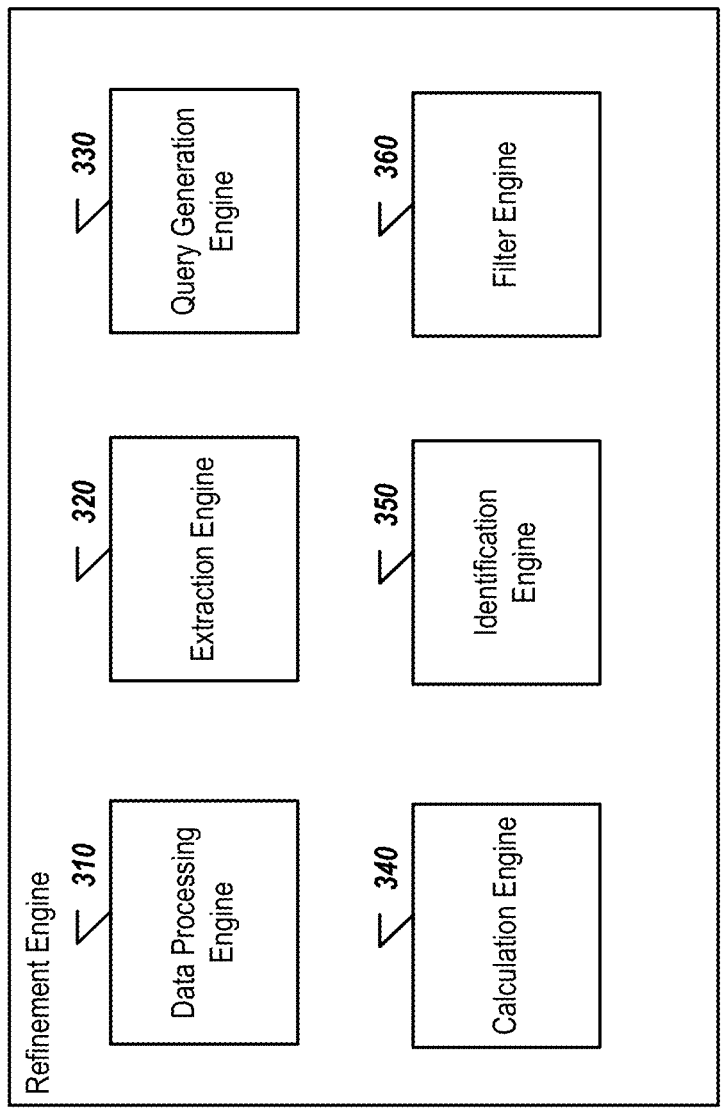
FIG. 3 is a block diagram of an example refinement engine.

FIG. 3 is a block diagram of an example refinement engine, e.g., an example of refinement engine 260 of FIG. 2. The refinement engine generates query refinements that can be alternatives to the query 210. In some implementations, the refinement engine is included in a search system, e.g., in the search system 214 of FIG. 2. In some alternative implementations, the refinement engine is external to a search system, and provides query refinements to the search system.

The refinement server includes a data processing engine 310, an extraction engine 320, a query generation engine 330, a calculation engine 340, an identification engine 350, and a filter engine 360. The engines in FIG. 3 logically represent executing software components or modules. These components can be combined or subdivided in ways other than those shown in FIG. 3 and can be distributed on multiple data processing apparatus.

The data processing engine 310 obtains and sends the query 210 to the extraction engine 320. The extraction engine 320 identifies one or more segments in the query 210 by dividing the query 210 into one or more n-grams.

An n-gram is a sequence of n consecutive tokens, e.g., words or characters. An n-gram has an order, which is the number of tokens in the n-gram. For example, a 1-gram (or unigram) includes one token; a 2-gram (or bi-gram) includes two tokens. As an example, a 2-gram can be the term "new york", where the tokens are words. As another example, a 3-gram can be the term "new york times".

Each n-gram has an associated probability estimate that is calculated as a function of n-gram relative frequency in training data. Examples of training data include dictionaries, web pages, search query logs, blogs, and news articles. A string of L tokens is represented as $W_1^L=(w_1, w_2, \ldots, w_L)$. A probability can be assigned to the string $W_1^L$ as:

$$P(w_1^L) = \prod_{i=1}^{L} P(w_i|w_1^{i-1}) \approx \prod_{i=1}^{L} \hat{P}(w_i|w_{i-n+1}^{i-1}),$$

where the approximation is based on a Markov assumption that only the most recent (n−1) tokens are relevant when predicting a next token in the string, and the "^" notation for P indicates that it is an approximation of the probability function.

The strings and associated probabilities can be stored in a language model. The extraction engine 320 can use the language model to identify the one or more n-grams. As an example, the extraction engine 320 can divide a query "new york times square" into two n-grams, i.e., two 2-grams, "new york" and "times square", based on probabilities of the n-grams each occurring as a term in training data.

In some implementations, the extraction engine 320 sends information identifying the segments, e.g., the n-grams, to the data processing engine 310. The data processing engine 310 determines for each identified n-gram a concept (or thing) represented by the n-gram, e.g., using conventional techniques such as identifying a meaning of the n-gram using a dictionary. The data processing engine 310 further compares the one or more concepts represented by the n-grams and determines whether the one or more n-grams represent the same concept. In some implementations, when the n-grams represent more than one concept, the data processing engine 310 sends each of the n-grams that represents a distinct concept to the query generation engine 330 and the query generation engine 330 generates query refinements for each of the n-grams that represents a distinct concept as if it were a separate query.

In some alternative implementations, the data processing engine 310 only sends the query to the query generation engine 330 when the one or more n-grams represent a same concept. As an example, a query "new york city NYC" can be divided into the n-grams "new york city" and "NYC", which each represent the same concept, i.e., the city New York City. As another example, the extraction engine 320 may not segment a query, i.e., may identify only one n-gram. In particular, the query may be a lexical item, i.e., a word or phrase that conveys a single meaning. For example, a query consisting of the lexical item "new york city" can be determined to be a single n-gram. Because the extraction engine 320 did not divide the query into multiple n-grams, the query can be considered as representing only one concept. On the other hand, a query "cheap new york city restaurants" can be divided into the three n-grams "cheap", "new york city", and "restaurants", each of which represents a different concept.

The query generation engine 330 receives the query and generates one or more candidate refinement queries. The query generation engine 330 can use one or more techniques, e.g., in parallel, to generate the one or more candidate refinement queries. Some possible techniques are described below.

In some implementations, the query generation engine 330 obtains, e.g., from a service external to the refinement engine, a data set including pairs of terms that represent similar queries. The pairs of terms can be identified, for example, from training data by determining pairs of training terms that occur in the same context in the training data. Terms that occur in the same context can be, for example, terms that share similar left contexts and right contexts. The left context of a term is an n-gram that immediately precedes the term in training data. The right context of the term is an n-gram that immediately follows the term in training data. The query generation engine 330 can select one or more pairs of terms from the dataset of pairs of terms such that one of the terms in the pair is the search query. The other term in each of the pairs is identified as being a candidate refinement query.

In some implementations, only terms with a left context and a right context that each include at least one core word, i.e., at least one word that is not a stop word, are identified as being candidate refinement queries. Stop words are words which are filtered out during processing of natural language data, e.g., commonly used words that may not be considered important to a search query. Examples of stop words include conjunctions (e.g., "and", "or") and articles (e.g., "a", "an", "the"). The other words in the term can be considered to be core words (or core terms), e.g., words that are important to a search query. In some implementations, only terms with a left context and a right context that are features of at least one previously-submitted query with a frequency of being submitted beyond a threshold value are identified as being candidate refinement queries. That is, the query generation engine 330 can consult a query log of previously submitted queries to determine whether each selected term shares a left and right context with a query in the query log that has been submitted beyond a threshold value. The previously submitted queries in the query log can be anonymized, e.g., using conventional anonymization techniques, so that a particular query in the query log cannot be associated with any user or user-identifying information.

The query generation engine 330 sends the search query and the one or more candidate refinement queries to the extraction engine 320. The extraction engine 320 extracts, e.g., using conventional techniques, features from training data for each of the search query and the candidate refinement queries, respectively. Examples of features include a right context, a left context, and edits of n-grams, in training data, that correspond to the search query and candidate refinement queries. The extracted features can be used to generate a feature vector for the search query and a feature vector for each of the one or more candidate refinement queries.

The data processing engine 310, extraction engine 320, and the calculation engine 340 can compare the feature vectors to determine a first initial score for each of the candidate refinement queries. The first initial score can represent a degree of similarity between the search query and a particular candidate refinement query.

In some implementations, the first initial score is the value of a dot product of the feature vectors. The calculation engine 340 determines the value of a dot product of a first function $f$ of the feature vector X of the search query, e.g., $f(X)$, and a second function g of the feature vector Y of a candidate refinement query, e.g., $g(Y)$. The dot product can be represented as a mathematical expression in the equation:

$$\sum_{i=1}^{n} f(x_i)g(y_i) = f(x_1)g(y_1) + f(x_2)g(y_2) + \ldots + f(x_n)g(y_n),$$

where n is an integer greater than 1. As an example, the functions f and g can be square functions.

In some implementations, candidate refinement queries are identified from session data, e.g., from queries from a particular search session in a query log. Each search session is a period of time during which a single user is submitting queries. Alternatively, a session is a number of queries submitted by a single user. Search sessions can be measured by a predefined period of time, or a predefined period of inactivity.

The query generation engine 330 can identify, in the session data, a previously-submitted query as being a candidate refinement query when the search query was submitted during a search session following submission of the previously-submitted query. In general, as the time period between the submission of two queries, e.g., during a single search session, decreases, the likelihood that the two queries are related increases.

In some implementations, only the identified previously-submitted queries that include core terms that are each distinct from the core terms of the search query are identified as being candidate refinement queries. That is, of the identified previously submitted queries, only the queries that do not have any core terms in common with the search query are identified as being candidate refinement queries. In some implementations, only the identified previously-submitted queries that do not include terms shared in common with the search query and are associated with an Inverse Document Frequency (IDF) beyond a threshold value (e.g., an IDF greater than 4.0), are identified as being candidate refinement queries. The IDF for a particular term is calculated by dividing a total number of documents in a corpus, e.g., the corpus of documents indexed by search engine or another corpus of documents accessible to query generation engine 330, by the number of documents in the corpus containing the term and taking the logarithm of the quotient.

A second initial score that represents a degree of correlation between the search query and a particular candidate refinement query can be calculated. In addition, the second initial score can be used as an input to calculate a total score for the particular candidate refinement query. Here, the initial score is referred to as a second initial score because the various techniques performed may be performed together and may identify one or more of the same candidate refinement queries. Each technique can generate an independent, initial score for a given candidate refinement query.

In particular, the second initial score can be a correlation value that is expressed by a ratio of the probability of the candidate refinement query R occurring in the search session following the search query Q, P(R|Q), to the probability of the candidate refinement query R occurring in the search session, P(R), or:

$$\frac{P(R|Q)}{P(R)}$$

The correlation value is used to indicate, i.e., is proportional to, the correlation between the candidate refinement query and the search query. In some implementations, the identification engine 350 identifies candidate refinement queries with a frequency of being submitted beyond a threshold submission value and with a correlation value beyond a first threshold correlation value, as being a query refinement. Furthermore, the identification engine 350 identifies candidate refinement queries with a frequency of being submitted that is not beyond the threshold value and with a correlation value beyond a different, second threshold correlation value as being a query refinement. The first threshold correlation value can be less than the different, second threshold correlation value. In other words, the threshold correlation value for a popular query, i.e., a query that is submitted more frequently than the threshold submission value, can be less than the threshold correlation value for a non-popular query, i.e., a query that is submitted less frequently than the threshold submission value. In some alternative implementations, the first threshold value and the second threshold value can be a same value.

In some implementations, the query generation engine 330 identifies sibling queries to the search query as being candidate refinement queries. The sibling queries can be identified from session data. Sibling queries are queries that have one or more shared parent queries in common. Each of the sibling queries was submitted during a search session following submission of a shared parent query during the search session. In some implementations, a sibling query is identified as being a candidate refinement query only when the search query is textually distinct from the candidate refinement query and all the substrings of the candidate refinement query. In other words, superstrings of the search query, e.g., strings that include the search query as a substring, are not identified as being candidate refinement queries.

A third initial score for each of the candidate refinement queries can be calculated based on a strength of relationship between a child query, e.g., the search query, and its sibling query, e.g., a candidate refinement query. The strength of the relationship between a child query and its sibling query can be measured from the strength of relationship each query has with the common parents shared between the two queries. The strength of the relationship between a parent query and a child query is derived from the number of times users submitted the parent query and then submitted the child query during a session, e.g., as determined from session data. In some implementations, the strength of relationship between a parent query and a child query is weighted by a weight that is inversely proportional to the number of child queries that share the parent query, inversely proportional to the number of parent queries the child query has, or both.

While the above examples describe generating the strength of relationship by summing the strengths between individual child and parent queries, other aggregation techniques can also be used, for example, calculating the minimum, maximum, median, or mean strengths between individual child and parent queries.

In some implementations, the query generation engine 330 generates candidate query refinements by identifying, in predetermined data representing parent-child hierarchies, a parent query of a previously-submitted query that corresponds to the search query. A previously-submitted query can be determined to correspond to the search query if, for example, the edit distance between the previously-submitted query and the search query is less than a specified threshold value. Once the parent query has been identified, the query generation engine 330 identifies one or more other child queries of the parent query, i.e., a sibling query of the previously submitted query corresponding to the search query, is identified as being a candidate query refinement. Each time the search query and candidate query refinement co-occur in the training data, e.g., occur in the same list or under the same hierarchy, a fourth initial score for the candidate query refinement can be adjusted, e.g., increased where a higher score indicates an increased quality of the candidate query refinement.

Once the candidate refinement queries are generated, e.g., using two or more of the above techniques, the initial scores of each candidate refinement query can be combined to produce a combined score for the candidate refinement query. The combination can include weights for each of the initial scores. The weights can represent confidence in the initial scores (and their respective techniques for generating the candidate refinement query and initial scores). As an example, the combination can be a linear combination represented as:

$$\text{combined\_score} = \alpha s_1 + \beta s_2 + \ldots + \delta s_j,$$

where an initial score s is adjusted by a weight (e.g., alpha, beta, delta), and the candidate refinement query has j initial scores. Other combinations are possible. For example, higher order polynomial combinations can be used to produce the combined scores.

The identification engine 350 can validate the candidate query refinements generated from the various techniques described above. The identification engine 350 determines categories in which the search query belongs. The identification engine 350 also determines categories in which the candidate query refinements belong. In some implementations, the identification engine 350 determines only a predetermined number of top categories (e.g., the top ten categories based on a number of occurrences in training data).

In some implementations, the categories are determined from parsing training data to determine IS-A relations. For example, a term A in the training data can be said to belong to a category B if the phrase "A is a B" would be considered correct by a speaker of the language. For instance, the terms "apple" and "orange" can both belong to a "fruit" category.

The IS-A relations can be derived from the training data, for example, by identifying the occurrence of the Hearst patterns "B such as A", "such B as A . . . ", "A . . . or other B", "A . . . and other B", "B including A", and "B, especially A . . . " in the training data. A term A can then be identified as belonging to a category B based on a frequency of occurrence of the term A in the same Hearst pattern as term B in the training data.

For a given candidate refinement query, the identification engine 350 compares the categories of the search query to the categories of the candidate refinement query. As the number of shared categories increases, the combined score for the given candidate refinement query can be adjusted to indicate an improvement in the quality of the given candidate refinement query. As the number of shared categories decreases, the combined score can be adjusted to indicate a decreased quality.

In some implementations, generic categories are removed from the comparison. A generic category can be identified by determining a number of previously submitted queries that belong in a given category. If the number of previously submitted queries that belong to the given category is greater than a threshold number, indicating that the category is likely to be broad, then the given category is identified as being a generic category.

The data processing engine 310 ranks, i.e., places in an order, the candidate query refinements according to their respective combined scores. The data processing engine 310 can then identify one or more of the candidate query refinements as query refinements, i.e., query suggestions, for the search query based on the ranking. For example, each candidate query refinement having a score above a particular threshold value can be selected. Alternatively, the data processing engine 310 can select a specified number of highest-ranked candidate query refinements.

The selected query refinements can be transmitted for presentation to a user, e.g., as query refinements for the received search query. Each query suggestion can be presented as a selectable link that, when activated, obtains search results for a query including the query refinement.

In some implementations, the group of candidate query refinements selected according to their combined scores can be further refined, e.g., filtered using various techniques, by the filter engine 360.

In some implementations, queries are identified as being parent-like. In these implementations, only other parent-like queries are identified as being query refinements to the search query. Identifying a query as being parent-like includes generating a modified query from the query. The modified query semantically represents a grouping that is related to a lexical item that is represented by the query. In particular, the modified query can be generated by appending a singular or plural form of the search query to text that indicates a grouping, e.g., "list of", "types of", "series of", "index of", "listing of", "classifications of", "categories of", "genres of", "varieties of", and "ways of". The query is identified as being parent-like when the modified query has a frequency of being submitted that is beyond a threshold value.

As an example, a query "tennis player" may be identified as being parent-like, as the modified query "list of tennis players" may have a high frequency of being submitted. Alternatively, a query "Roger Federer" would not be identified as being parent-like, as the modified queries "list of Roger Federer" and "list of Roger Federers" would not have a high frequency of being submitted.

Other implementations of filtering are possible. For example, the system can filter out queries that are pornographic (e.g., contain pornographic text or will lead to pornographic results), or that contain offensive or hateful speech. The list of phrases to filter can be pre-defined. In some implementations, duplicate queries can be excluded from the query refinements that are provided. Duplicate queries can be identified from a syntactical analysis of the queries. For example, if the two queries have an edit distance that satisfies, e.g., is below, a threshold, then the two queries can be determined to be duplicates.

Figure 4:
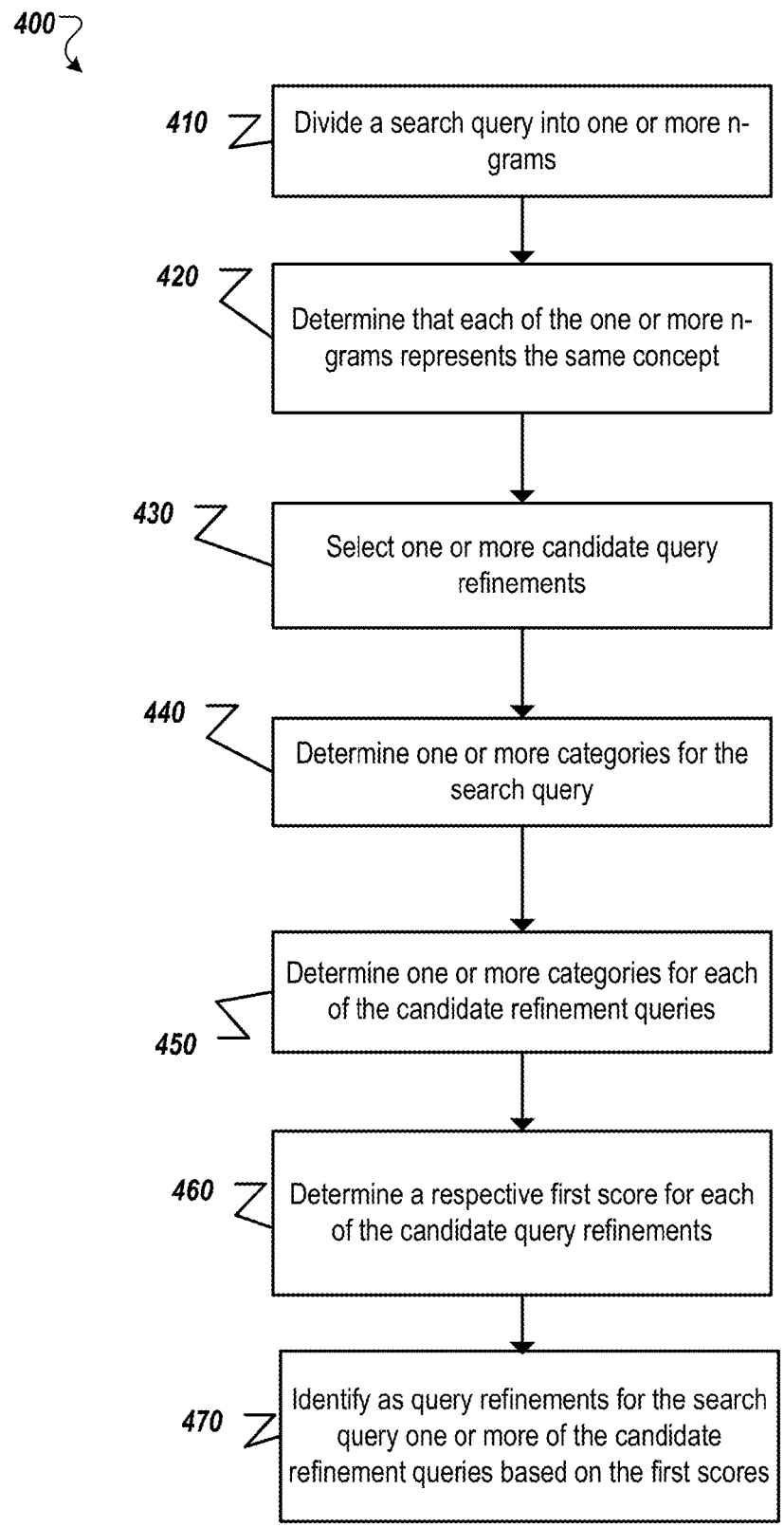
FIG. 4 is a flow chart showing an example process for generating query refinements.

FIG. 4 is a flow chart showing an example process 400 for generating query refinements. The process 400 includes dividing 410 a search query into one or more n-grams. The process 400 also includes determining 420 that each of the one or more n-grams represents the same concept. The process 400 also includes, in response to the determination, performing steps 430, 440, 450, 460, and 470. The process 400 includes selecting 430 one or more candidate refinement queries. The process 400 also includes determining 440 one or more categories for the search query. The process 400 further includes determining 450 one or more categories for each of the candidate refinement queries. The process further includes determining 460 a respective first score for each of the candidate refinement queries, wherein the first score for a particular candidate refinement query is adjusted based on a number of categories shared between the particular candidate refinement query and the search query. The process further includes identifying 470 as query refinements for the search query one or more of the candidate refinement queries based on the first scores Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method implemented by data processing apparatus, the method comprising:
   obtaining a search query;
   selecting one or more candidate refinement queries, wherein selecting one or more candidate refinement queries comprises:
      selecting one or more terms from training data as candidate refinement queries, wherein a respective right context of each of the selected terms in the training data includes at least one word in a right context of the search query, and wherein a respective left context of each of the selected terms in the training data includes at least one word in a left context of the search query;
   determining one or more categories for the search query;
   determining one or more categories for each of the candidate refinement queries;
   determining a respective first score for each of the candidate refinement queries, wherein determining the respective first score for the candidate refinement query comprises adjusting the respective first score for the candidate refinement query based on a number of categories shared between the candidate refinement query and the search query; and
   identifying as query refinements for the search query one or more of the candidate refinement queries based on the first scores.

2. The method of claim 1 wherein the at least one word included in the respective right context of each of the selected terms and in the right context of the search query is not a stop word, and wherein the at least one word included in the respective left context of each of the selected terms and in a left context of the search query is not a stop word.

3. The method of claim 1 wherein the respective right contexts and left contexts of the selected terms are features of one or more previously submitted queries having a frequency of being submitted beyond a threshold value.

4. The method of claim 1, further comprising:
   generating a feature vector for the search query and for one or more of the selected terms, wherein the respective first score for a particular selected term is based at least in part on a dot product of a mathematical function of a feature vector of the search query and a mathematical function of a feature vector of the particular selected term.

5. The method of claim 1 wherein selecting one or more candidate refinement queries comprises:
   selecting one or more previously submitted queries as candidate refinement queries, wherein the selected previously submitted queries were submitted during a first search session following submission of the search query.

6. The method of claim 5 wherein the selected previously submitted queries do not contain any terms from the search query that are not stop words.

7. The method of claim 5 wherein the respective first score for each of the selected previously submitted queries is based at least in part on a respective correlation value for the selected previously submitted query, wherein the correlation value for a particular previously submitted query represents the correlation between the search query and the particular previously submitted query.

8. The method of claim 1, wherein selecting one or more candidate refinement queries comprises:
   selecting as candidate refinement queries one or more sibling queries of the search query, wherein sibling queries are queries that have one or more shared parent queries in common, and wherein each of the sibling queries was submitted during a second search session following submission of a shared parent query during the first search session.

9. The method of claim 8, wherein the search query is textually distinct from each of the selected sibling queries and all the substrings of the selected sibling queries.

10. The method of claim 1 wherein determining the one or more categories for a particular candidate refinement query includes:
    determining, in training data, a frequency of occurrence of the particular candidate refinement query in a Hearst pattern with a particular category label; and
    determining that the particular candidate refinement query belongs to a category corresponding to the particular category label based on the frequency of occurrence.

11. The method of claim 1, further comprising:
    determining that the search query is parent-like; and
    selecting only candidate refinement queries that are parent-like as being refinement queries for the search query.

12. The method of claim 11, where determining that a particular query is parent-like includes:
    generating a modified query that semantically represents a grouping, where the grouping is related to a lexical item represented by the particular query; and
    determining that the particular query is parent-like when the modified query has a frequency of being submitted beyond a threshold value.

13. A method implemented by data processing apparatus, the method comprising:
  obtaining a search query;
  selecting one or more previously submitted queries as candidate refinement queries, wherein the selected previously submitted queries were submitted by a user during a first search session following submission of the search query, and wherein the first search session includes search queries submitted by the user during a first period of time;
  selecting one or more terms from training data as candidate refinement queries, wherein a respective right context of each of the selected terms in the training data includes at least one word in a right context of the search query, and wherein a respective left context of each of the selected terms in the training data includes at least one word in a left context of the search query;
  determining one or more categories for the search query;
  determining one or more categories for each of the candidate refinement queries;
  determining a respective first score for each of the candidate refinement queries, wherein determining the respective first score for the candidate refinement query comprises adjusting the respective first score for the candidate refinement queries based on a number of categories shared between the candidate refinement query and the search query; and
  identifying as query refinements for the search query one or more of the candidate refinement queries based on the first scores.

14. The method of claim 13 wherein the at least one word included in the respective right context of each of the selected terms and in the right context of the search query is not a stop word, and wherein the at least one word included in the respective left context of each of the selected terms and in the left context of the search query is not a stop word.

15. The method of claim 13 wherein the respective right contexts and left contexts of the selected terms are features of one or more previously submitted queries having a frequency of being submitted beyond a threshold value.

16. The method of claim 13, further comprising:
  generating a feature vector for the search query and for one or more of the selected terms, wherein the respective first score for a particular selected term is based at least in part on a dot product of a mathematical function of a feature vector of the search query and a mathematical function of a feature vector of the particular selected term.

17. The method of claim 13 wherein the selected previously submitted queries do not contain any terms from the search query that are not stop words.

18. The method of claim 13 wherein the respective first score for each of the selected previously submitted queries is based at least in part on a respective correlation value for the selected previously submitted query, wherein the correlation value for a particular previously submitted query represents the correlation between the search query and the particular previously submitted query.

19. The method of claim 13, further comprising:
  selecting as candidate refinement queries one or more sibling queries of the search query, wherein sibling queries are queries that have one or more shared parent queries in common, and wherein each of the sibling queries was submitted during a second search session following submission of a shared parent query during the first search session.

20. The method of claim 18, wherein the search query is textually distinct from each of the selected sibling queries and all the substrings of the selected sibling queries.

21. The method of claim 13 wherein determining the one or more categories for a particular candidate refinement query includes:
  determining, in training data, a frequency of occurrence of the particular candidate refinement query in a Hearst pattern with a particular category label; and
  determining that the particular candidate refinement query belongs to a category corresponding to the particular category label based on the frequency of occurrence.

22. The method of claim 13, further comprising:
  determining that the search query is parent-like; and
  selecting only candidate refinement queries that are parent-like as being refinement queries for the search query.

23. The method of claim 22, where determining that the search query is parent-like includes:
  generating a modified query that semantically represents a grouping, where the grouping is related to a lexical item represented by the particular query; and
  determining that the search query is parent-like when the modified query has a frequency of being submitted beyond a threshold value.

24. A system comprising:
  a machine-readable storage device including a program product; and
  one or more processors operable to execute the program product and perform operations comprising:
  obtaining a search query;
    selecting one or more candidate refinement queries, Wherein selecting one or more candidate refinement queries comprises:
      selecting one or more terms from training data as candidate refinement queries wherein a respective right context of each of the selected terms in the training data includes at least one word in a right context of the search query, and wherein a respective left context of each of the selected terms in the training data includes at least one word in a left context of the search query;
    determining one or more categories for the search query;
    determining one or more categories for each of the candidate refinement queries;
    determining a respective first score for each of the candidate refinement queries, wherein determining the respective first score for the refinement query comprises adjusting the respective first score for the candidate refinement query based on a number of categories shared between the particular refinement query and the search query; and
    identifying as query refinements for the search query one or more of the candidate refinement queries based on the first scores.

25. The system of claim 24 wherein the at least one word included in the respective right context of each of the selected terms and in the right context of the search query is not a stop word, and wherein the at least one word included in the respective left context of each of the selected terms and in a left context of the search query is not a stop word.

26. The system of claim 24 wherein the respective right contexts and left contexts of the selected terms are features of at least one of the previously submitted queries having a frequency of being submitted beyond a threshold value.

27. The system of claim 24, the operations further comprising:
generating a feature vector for the search query and for one or more of the selected terms, wherein the respective first score for a particular selected term is based at least in part on a dot product of a mathematical function of a feature vector of the search query and a mathematical function of a feature vector of the particular selected term.

28. The system of claim 24 wherein selecting one or more candidate refinement queries comprises:
selecting one or more previously submitted queries as candidate refinement queries, wherein the selected previously submitted queries were submitted during a first search session following submission of the search query.

29. The system of claim 28 wherein the selected previously submitted queries do not contain any terms from the search query that are not stop words.

30. The system of claim 28 wherein the respective first score for each of the selected previously submitted queries is based at least in part on a respective correlation value for the selected previously submitted query, wherein the correlation value for a particular previously submitted query represents the correlation between the search query and the particular previously submitted query.

31. The system of claim 24, wherein selecting one or more candidate refinement queries comprises:
selecting as candidate refinement queries one or more sibling queries of the search query, wherein sibling queries are queries that have one or more shared parent queries in common, and wherein each of the sibling queries was submitted during a second search session following submission of a shared parent query during the first search session.

32. The system of claim 31, wherein the search query is textually distinct from each of the selected sibling queries and all the substrings of the selected sibling queries.

33. The system of claim 24 wherein determining the one or more categories for a particular candidate refinement query includes:
determining, in training data, a frequency of occurrence of the particular candidate refinement query in a Hearst pattern with a particular category label; and
determining that the particular candidate refinement query belongs to a category corresponding to the particular category label based on the frequency of occurrence.

34. The system of claim 24, the operations further comprising:
determining that the search query is parent-like; and
selecting only candidate refinement queries that are parent-like as being refinement queries for the search query.

35. The system of claim 34, wherein determining that a particular query is parent-like includes:
generating a modified query that semantically represents a grouping, where the grouping is related to a lexical item represented by the particular query; and
determining that the particular query is parent-like when the modified query has a frequency of being submitted beyond a threshold value.

36. A system comprising:
a machine-readable storage device including a program product; and
one or more processors operable to execute the program product and perform operations comprising:
obtaining a search query;
selecting one or more previously submitted queries as candidate refinement queries, wherein the selected previously submitted queries were submitted by a user during a first search session following submission of the search query, and wherein the first search session includes search queries submitted by the user during a first period of time;
selecting one or more terms from training data as candidate refinement queries, wherein a respective right context of each of the selected terms in the training data includes at least one word in a right context of the search query, and wherein a respective left context of each of the selected terms in the training data includes at least one word in a left context of the search query;
determining one or more categories for the search query;
determining one or more categories for each of the candidate refinement queries;
determining a respective first score for each of the candidate refinement queries, wherein determining the respective first score for the candidate refinement query comprises adjusting the respective first score for the candidate refinement queries based on a number of categories shared between the candidate refinement query and the search query; and
identifying as query refinements for the search query one or more of the candidate refinement queries based on the first scores.

37. The system of claim 36 wherein the at least one word included in the respective right context of each of the selected terms and in the right context of the search query is not a stop word, and wherein the at least one word included in the respective left context of each of the selected terms and in the left context of the search query is not a stop word.

38. The system of claim 36 wherein the respective right contexts and left contexts of the selected terms are each features of one or more previously submitted queries having a frequency of being submitted beyond a threshold value.

39. The system of claim 36, the operations further comprising:
generating a feature vector for the search query and for each one or more of the selected terms, wherein the respective first score for a particular selected term is based at least in part on a dot product of a mathematical function of a feature vector of the search query and a mathematical function of a feature vector of the particular selected term.

40. The system of claim 36 wherein none of the selected previously submitted queries do not contain any terms from the search query that are not stop words.

41. The system of claim 36 wherein the respective first score for each of the selected previously submitted queries is based at least in part on a respective correlation value for the selected previously submitted query, wherein the correlation value for a particular previously submitted query that represents the correlation between the search query and the particular previously submitted query.

42. The system of claim 36, the operations further comprising:
selecting as candidate refinement queries one or more sibling queries of the search query, wherein sibling queries are queries that have one or more shared parent queries in common, and wherein each of the sibling queries was submitted during a second search session following submission of a shared parent query during the first search session.

43. The system of claim 42, wherein the search query is textually distinct from each of the selected sibling queries and all the substrings of the selected sibling queries.

44. The system of claim 36 wherein determining the one or more categories for a particular candidate refinement query includes:
- determining, in training data, a frequency of occurrence of the particular candidate refinement query in a Hearst pattern with a particular category label; and
- determining that the particular candidate refinement query belongs to a category corresponding to the particular category label based on the frequency of occurrence.

45. The system of claim 36, the operations further comprising:
- determining that the search query is parent-like; and
- selecting only candidate refinement queries that are parent-like as being refinement queries for the search query.

46. The system of claim 45, wherein determining that a particular query is parent-like includes:
- generating a modified query that semantically represents a grouping, where the grouping is related to a lexical item represented by the particular query; and
- determining that the particular query is parent-like when the modified query has a frequency of being submitted beyond a threshold value.

47. A computer program product, encoded on a non-transitory computer readable medium, operable to cause data processing apparatus to perform operations comprising:
- obtaining a search query;
- selecting one or more candidate refinement queries, wherein selecting one or more candidate refinement queries comprises:
  - selecting one or more terms from training data as candidate refinement queries, wherein a respective right context of each of the selected terms in the training data includes at least one word in a right context of the search query, and wherein a respective left context of each of the selected terms in the training data includes at least one word in a left context of the search query;
- determining one or more categories for the search query;
- determining one or more categories for each of the candidate refinement queries;
- determining a respective first score for each of the candidate refinement queries, wherein determining the respective first score for the candidate refinement query comprises adjusting the respective first score for the candidate refinement query based on a number of categories shared between the candidate refinement query and the search query; and
- identifying as query refinements for the search query one or more of the candidate refinement queries based on the first scores.

48. A computer program product, encoded on a non-transitory computer readable medium, operable to cause data processing apparatus to perform operations comprising:
- obtaining a search query;
- determining that each n-gram derived from the search query represents a same concept, and in response to the determination:
  - selecting one or more previously submitted queries as candidate refinement queries, wherein the selected previously submitted queries were submitted by a user during a first search session following submission of the search query, and wherein the first search session includes search queries submitted by the user during a first period of time;
  - selecting one or more terms from training data as candidate refinement queries, wherein a respective right context of each of the selected terms in the training data includes at least one word in a right context of the search query, and wherein a respective left context of each of the selected terms in the training data includes at least one word in a left context of the search query;
- determining one or more categories for the search query;
- determining one or more categories for each of the candidate refinement queries;
- adjusting a respective first score for each of the candidate refinement queries based on a number of categories shared between the candidate refinement query and the search query; and
- identifying as query refinements for the search query one or more of the candidate refinement queries based on the first scores.

* * * * *

UNITED STATES PATENT AND TRADEMARK OFFICE
CERTIFICATE OF CORRECTION

PATENT NO.        : 8,688,727 B1
APPLICATION NO.   : 13/094794
DATED             : April 1, 2014
INVENTOR(S)       : Anwis Das et al.

Page 1 of 1

It is certified that error appears in the above-identified patent and that said Letters Patent is hereby corrected as shown below:

In the Claims

In claim 24, column 16, line 34, please delete "Wherein" and insert --wherein--; and In claim 24, column 16, line 37, please delete "queries" and insert --queries,--.

Signed and Sealed this
First Day of July, 2014

Michelle K. Lee
*Deputy Director of the United States Patent and Trademark Office*